Jan. 12, 1932.  R. TRANE  1,841,163
SCRAPING UTENSIL
Filed June 10, 1929
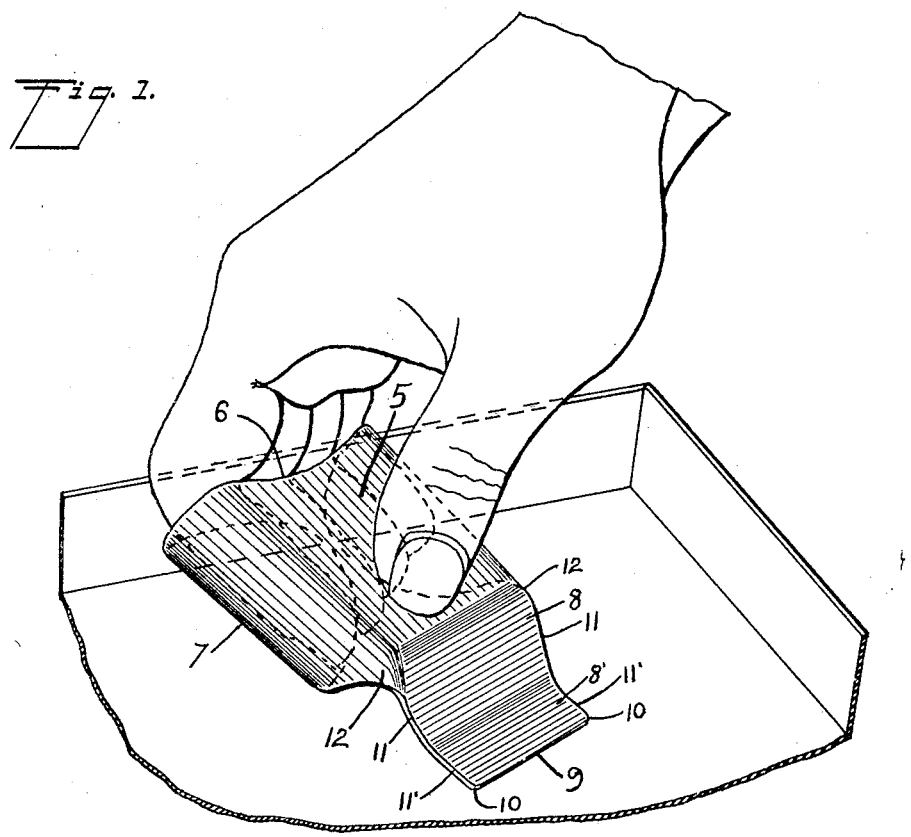
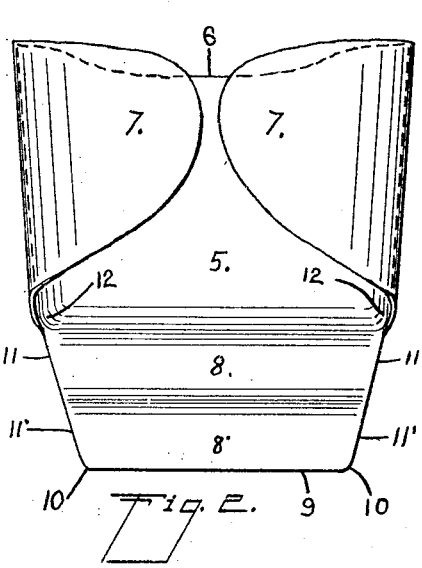
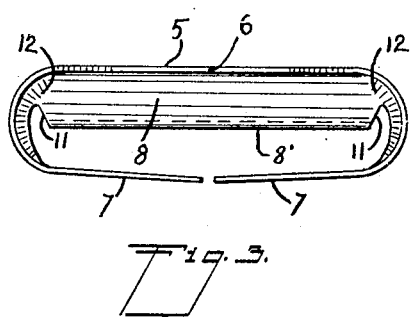
R. TRANE. INVENTOR
BY David O. Barnell
ATTORNEY Patented Jan. 12, 1932

1,841,163

UNITED STATES PATENT OFFICE

RAYMOND TRANE, OF OMAHA, NEBRASKA

SCRAPING UTENSIL

Application filed June 10, 1929. Serial No. 369,310.

My invention relates to scraping utensils, and it is the object thereof to provide a simple, convenient and inexpensive device, especially adapted for use with pots, pans and the like, for scraping the interior surfaces, including the sides and corners, of such receptacles. A further object of my invention is to provide a scraper of general utility, which may be held upon one hand of the user, and with which the working edge may be applied to any surface which is accessible to the hand, the movements of the hand required to manipulate the utensil being essentially the same that would be made if the scraping were to be effected with the finger-nails.

In the accompanying drawings Fig. 1 is a perspective view of a scraper embodying my invention, showing the manner in which the same is held upon the hand and applied to the work, Fig. 2 is a rear view of the utensil, and Fig. 3 is a plan view thereof.

In carrying out my invention according to the illustrated embodiment thereof, the device is formed from a single piece of sheet metal, and for domestic use it is preferably made of hard-rolled sheet aluminum, this material being light, non-corrosible, sufficiently rigid for the purpose desired, yet soft enough to avoid cutting or scratching the surfaces of aluminum cooking utensils on which it may be used.

The plate or blank from which the scraper is formed has an approximately trapeziform body portion 5 of which the upright sides are slightly convergent from the upper toward the lower end, and the upper edge 6 is slightly concaved or curved downwardly. At the convergent sides of the body portion are symmetrical wings 7 which taper toward the rounded ends thereof. At the lower end of the body portion is a lip 8 of which the lower edge 9 is straight, the corners 10 being slightly rounded, and the lateral edges 11 diverging symmetrically at a slightly obtuse angle to the lower edge 9.

In the formation of the scraper from the described blank, the lower corner portions of the body 5 are swaged or drawn rearwardly to form the sphero-segmental concavo-convex shoulders 12, which merge into the upper portion of the lip 8 and the adjacent inner portions of the wings 7, and said inner portions of the wings are bent rearwardly about an axis approximately parallel with the adjoining sides of the body 5, so that the terminal portions of the wings extend toward each other across the rear side of the body 5 in spaced relation thereto. The upper portion of the lip 8 is inclined rearwardly from the plane of the body 5, and the lower portion 8' of the lip is inclined forwardly from the upper portion, the inclination being such that an upward extension of the plane of said portion 8' would pass behind the rear portions of the wings 7, and a similar extension of the lateral edges 11' of the lip-terminal would not intersect the side portions of the wings.

In the use of the scraper, the same is placed upon the hand substantially as shown in Fig. 1, or so that the body 5 covers the palmar surface of the fingers, the wings 7 extending about the sides and across the backs of the fingers, and the scraper being held in place by a slight pressure of the thumb against the front side of the body 5. The concave upper edge 6 of the scraper-body permits the natural bend of the second joints of the two middle fingers, so that the first phalanges of all the fingers may exert a uniform pressure against said edge 6 to force the lower edge 9 against the work. The working edge 9 is applied to the surface to be scraped, and is pushed across such surface by movements of the hand and wrist, the positions assumed by the hand being substantially the same that would result if the scraping were to be effected by the use of the finger-nails. The scraping operation is thus performed with ease and naturalness, without fatigue to the user.

By the described inclination of the lip portion 8' and the lateral working edges 11', the latter may engage portions of the bottom of a pan or other receptacle, while the main working edge 9 is engaged with the side-wall of the receptacle, and the corners 10 may readily enter the corners of the receptacle. The sphero-segmental swaged shoulder portions 12 serve to materially stiffen and support the lip 8, and form also a partial bottom for the finger-receiving pocket comprised between the body-plate 5 and the wings 7. The lower rear portion of the finger-receiving pocket being open as shown, all surfaces of the utensil are freely accessible for cleansing, and the scraper may thus be easily kept in a sanitary condition.

Now, having described my invention, what I claim and desire to secure by Letters Patent is:

A scraping utensil for use on the interior surfaces of pans and the like, comprising a single piece of sheet metal having a trapeziform body portion, wing portions on the converging sides, and a lip extending from the narrow end of the body portion, the corners of the body portion adjoining the lip and wing portions being swaged rearwardly to form concavo-convex shoulders, the wing portions being curved rearwardly and across the back of the body portion to inclose the sides and portions of the back of a finger-receiving space terminating at said swaged shoulders and open at both ends thereof, said lip adjacent to the end of the finger-receiving space being inclined rearwardly from the body portion and the terminal portion of the lip being inclined forwardly to lie in a plane extending rearwardly of the wing portions, said forwardly inclined terminal portion of the lip having a transverse working-edge and lateral working-edges extending obtusely to said transverse edge, whereby said working-edges are adapted to engage simultaneously a corner and portions of the side and bottom of the interior surface of a pan.

RAYMOND TRANE.